April 7, 1964 S. KARBOWSKI 3,127,710
WORK-ENGAGING AND POSITIONING DEVICE FOR MACHINE TOOLS
Filed July 3, 1962 4 Sheets-Sheet 1
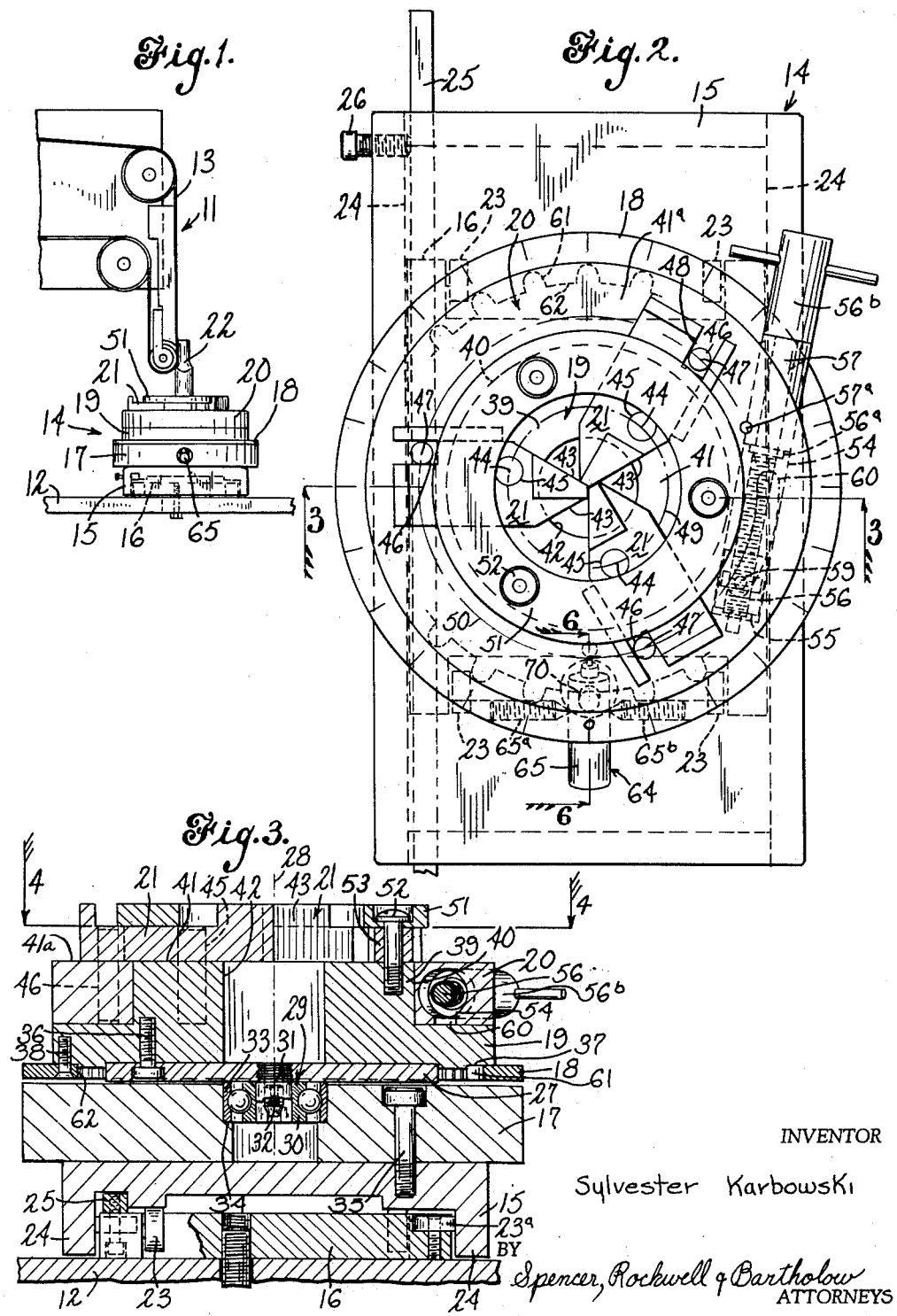
INVENTOR
Sylvester Karbowski
BY
Spencer, Rockwell & Bartholow
ATTORNEYS April 7, 1964 S. KARBOWSKI 3,127,710
WORK-ENGAGING AND POSITIONING DEVICE FOR MACHINE TOOLS
Filed July 3, 1962 4 Sheets-Sheet 2

INVENTOR
Sylvester Karbowski

BY
Spencer, Rockwell & Bartholow
ATTORNEYS

April 7, 1964 S. KARBOWSKI 3,127,710
WORK-ENGAGING AND POSITIONING DEVICE FOR MACHINE TOOLS
Filed July 3, 1962 4 Sheets-Sheet 3

INVENTOR
Sylvester Karbowski

BY
Spencer, Rockwell & Bartholow
ATTORNEYS

April 7, 1964 S. KARBOWSKI 3,127,710
WORK-ENGAGING AND POSITIONING DEVICE FOR MACHINE TOOLS
Filed July 3, 1962 4 Sheets-Sheet 4
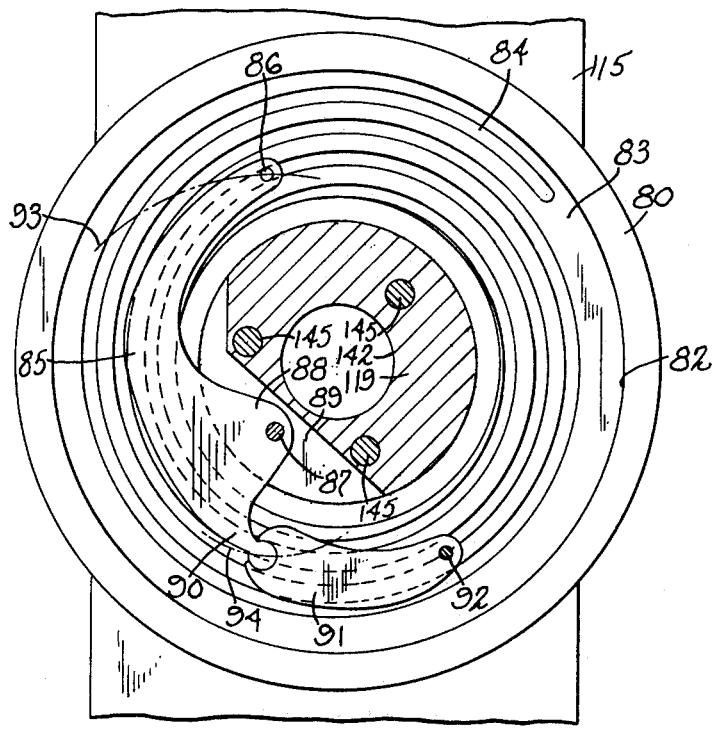
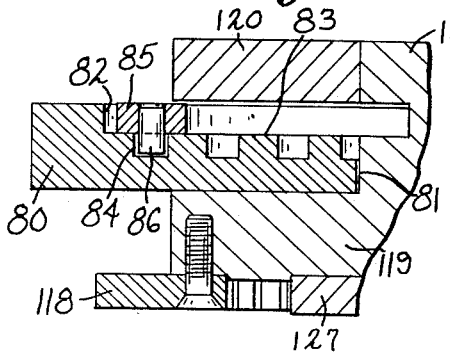
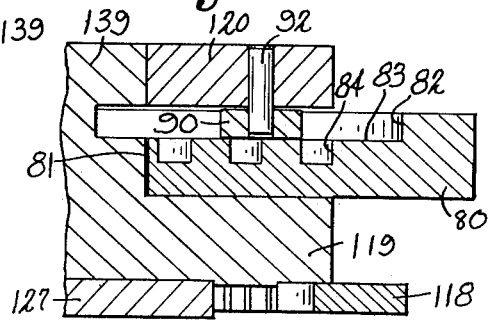
INVENTOR
Sylvester Karbowski
BY Spencer, Rockwell & Bartholow
ATTORNEYS

United States Patent Office 3,127,710
Patented Apr. 7, 1964

3,127,710
WORK-ENGAGING AND POSITIONING DEVICE
FOR MACHINE TOOLS
Sylvester Karbowski, New Haven, Conn., assignor to
Progressive Tool & Manufacturing Company, East
Haven, Conn., a partnership
Filed July 3, 1962, Ser. No. 207,349
12 Claims. (Cl. 51—135)

This invention pertains to machine tools of the type adapted to perform an operation on a workpiece selectively positioned in an operative position to an operating element thereof and, more particularly, relates to work-holding fixtures arranged to engage and position a workpiece while a machining operation is performed thereon.

In machining operations it is quite important that a workpiece be accurately positioned and held with respect to a reference line or axis while a tool performs a machining operation on the workpiece, such as grinding or cutting. To position and hold a workpiece it is quite common practice to provide a fixture including chucking means comprising a plurality of chucking elements, which are radially movable with respect to a reference line or axis, to engage and hold a workpiece at spaced points about its periphery. Such work-holding fixtures should be capable of rapid and accurate adjustment to allow insertion and withdrawal of a workpiece therein and should also be capable of accurately aligning an axis of the workpiece with a reference line or axis of the fixture.

In many applications after an operation has been performed on a workpiece it is removed from the fixture to be checked against a master gauge or with a mating part to determine the accuracy of the operation. Often as a result of such a check it is necessary to replace the workpiece in the fixture to have additional work performed thereon. Some difficulty may be experienced in accurately repositioning the workpiece in the fixture along the original reference line or axis due to small discrepancies in movement of the workengaging and -holding elements of the fixture.

Accordingly, this invention provides a work-holding fixture including chucking means of simplified construction which allows rapid insertion of a work piece therein and withdrawal therefrom and in particular provides extremely precise centering of a workpiece in a fixture after it may be removed therefrom and it is found necessary to replace the workpiece in the fixture for further operation thereon.

It is an object of this invention to provide a new and improved workpiece-holding fixture including chucking means of simplified construction capable of repositioning a workpiece in operative relation to a machining element with very precise accuracy.

It is a further object of this invention to provide a new and improved workpiece-holding fixture where a workpiece may be removed from the device and re-inserted therein with its axis very precisely coinciding with the axis of the holding device as originally positioned.

It is another object of this invention to provide a workpiece-holding fixture wherein the work engaging elements, when removed from an engaging position to release a workpiece, always return to the same engaging position if the workpiece is re-inserted in the holding device.

It is another object of this invention to provide a workpiece-holding fixture including chucking means wherein chucking elements adapted to engage, position and hold a workpiece have only rotative motion about fixed pivot points equidistant from a reference axis, in moving into or out of engagement with a workpiece to thus insure that the chucking elements always return to engage the workpiece in the same position if it should be necessary to re-insert the workpiece in the fixture.

The features of the invention which are believed to be novel are pointed out with particularity in the claims appended to and forming part of this specification. However, it is believed that the invention both as to its organization and operation together with further objects and advantages thereof, may best be appreciated by reference to the following description taken in conjunction with the drawings wherein:

FIG. 1 is a fragmentary view illustrating in elevation a belt-grinding machine having a workpiece-holding fixture embodying the invention;

FIG. 2 is a plan view of the fixture of FIG. 1;

FIG. 3 is a view along section 3—3 of FIG. 2;

FIG. 9 is a view along section 9—9 of FIG. 8;

FIG. 10 is a view along section 10—10 of FIG. 7; and

FIG. 11 is a view along section 11—11 of FIG. 7.

Figure 4:
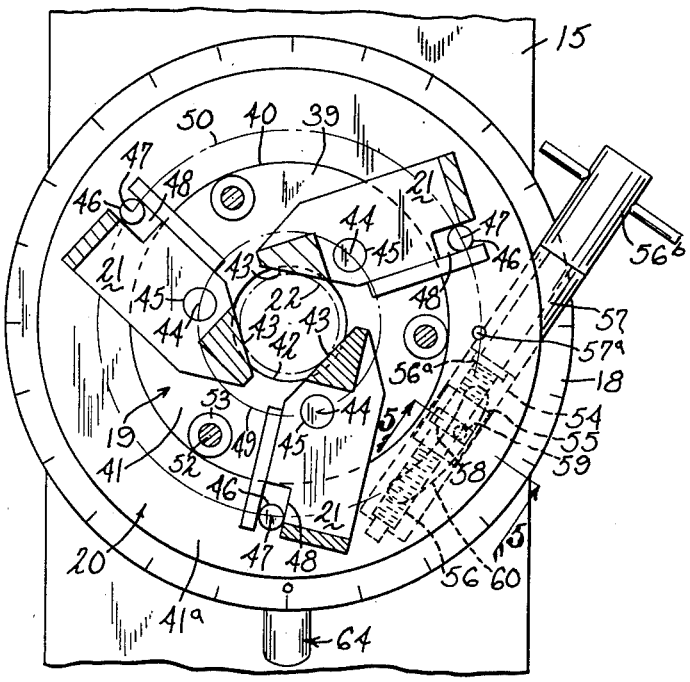
FIG. 4 is a view seen along section 4—4 of FIG. 3 with a workpiece positioned within the fixture.

With reference to the drawings, FIG. 1 illustrates a belt-grinding machine 11 including a movable work-support member or bed plate 12, and having an abrasive belt 13 arranged to be driven by a power transmission system, not shown. Carried on bed plate 12 is a work-holding fixture 14 which comprises a table member 15 guidably movable on a guiding fixture 16 mounted on bed plate 12. The fixture 14 further comprises a base or carrier member 17, an indexing member 18 and adjustable workpiece-engaging means which in the drawings comprises a first member hereinafter referred to as a body member 19, a second member hereinafter referred to as an adjusting member 20 and a plurality of chucking elements 21 adapted to engage, accurately position, and hold a workpiece 22 which in FIG. 1 is having a grinding operation performed thereon by the abrasive belt 13 of belt grinder 11.

The workpiece 22 may be a punch which must be ground to an extremely accurate shape to mate with a die and therefore may have to be removed from fixture 14 and gaged and replaced for further grinding before it achieves the desired shape. The belt grinder 11 is preferably of the type disclosed and claimed in Patent 2,934,864, assigned to the same assignee as the present invention, the disclosure of which is incorporated herein.

Reference is now made to FIGS. 2 through 6 which illustrate in more detail the fixture 14 of FIG. 1. The fixture guiding member 16, as shown in FIG. 3, is rigidly secured to bed plate 12 and provides vertically arranged rolling elements 23 which support table 15 for horizontal movement thereon. Fixture guiding member 16 further provides horizontally disposed rolling elements 23a which guidably engage depending legs 24 of table 15 along a fixed path transverse of the plane of abrasive belt 13. The fixture-guiding member 16 also has a locking bar 25 secured thereto extending longitudinally thereof and adapted to be engaged by a clamping bolt 26 threaded through a leg 24 of table 15 to lock table 15 in a given position. A center plate 27 having an axis 28 is rotatably mounted on base 17 by means of an anti-friction bearing assembly 29. Center plate 27 is coaxially carried on the inner race 30 of bearing assembly 29 as by means of a member 31 within inner race 30 which threadably extends in center plate 27. The portion of member 31 within inner race 30 may be secured therein by a screw 32 which expands member 31 against the inner race 30. The outer race 33 of bearing assembly 29 is mounted on base 17 on a shoulder 34 provided therefor so that the axis of the bearing assembly 29 coincides with the rotative axis of center plate 27. Base 17 is secured on table 15 as by means of a plurality of bolts 35 each having a head countersunk past the upper surface of base 17 and a shank portion threadably received in table 15.

Body member 19 which is of annular shape is mounted on center plate 27 coaxial with axis 28 and non-rotatably secured to center plate 27 by a plurality of bolts 36 extending through center plate 27 into threadable engagement with member 19. Indexing member 18 is mounted on and carried by body member 19 and is coaxial therewith. Indexing member 18 is fitted onto an annular shoulder 37 about body member 19 and secured thereto by a plurality of bolts or screws 38.

Body member 19 has an annular upward projection 39 having a cylindrical surface 40 concentric with axis 28. Adjusting member 20 is rotatably mounted on body member 19 coaxial with surface 40 and is concentrically disposed about projecting portion 39. Body member 19 and adjusting member 20 have surfaces, 41 and 41a respectively, residing in essentially parallel planes, which, as illustrated are coincident. Body member 19 defines a recess 42 about axis 28 adapted to receive a workpiece inserted therein.

In accordance with one aspect of the invention, new and improved workpiece-engaging or chucking means are provided which comprise the body member 19, adjusting member 20, chucking elements 21, which in the preferred form of the invention are identical and have work-engaging surfaces 43, which in the closed position shown in FIG. 2 extend radially from axis 28. The chucking elements 21 are pivotally mounted on surface 41 of projection 39 about respective fixed pivot points 44 (FIG. 2) which are the axes of pivot pins 45 extending parallel to axis 28. Adjusting member 20 carries thereon chucking element-actuating or engaging means shown as identical pins 46 having axis 47 parallel to axis 28.

Each of the pins 46 is arranged to produce a turning moment on its associated chucking element upon relative rotation of body member 20 and adjusting member 19 and is positioned within a slot 48 defined by each of the chucking elements 21. Upon relative rotation of adjusting member 19 and body member 20, pins 46 transmit a force to the chucking elements 21 adjacent the outboard ends thereof to cause the chucking elements 21 and therefore the work-engaging surfaces 43 to rotate about their respective pivot points 44.

The pivot pin 45 and the actuating pin 46 associated with each chucking element are so radially dimensioned from axis 28 that upon relative rotation of members 19 and 20 the movements imparted to the work-engaging surfaces 43 are equal. It will be apparent that this condition is satisfied by locating all pivot points 44 an equal radial dimension from reference axis 28 as exemplified by center line 49 (FIG. 2) about axis 28 passing through all pivot points 44 and also locating the axes of all actuating pins 46 an equal radial dimension from reference axis 28 as indicated by centerline 50 (FIGS. 2 and 4) about axis 28 passing through the axes 47 of each of the actuating pins. Also, the axes 47 of the actuating pins 46 have the same angular relationship relative to axis 28 as do the pivot points 44.

It may be seen that the arrangement of the pivot points 44 and actuating pins 46 as illustrated are such as to make each chucking element 21 act as a lever of the first class upon relative rotation of members 19 and 20. Equivalent operation of the chucking elements would be achieved by reversing the location of the pivot points 44 and the actuating pins 46 so that upon reverse arrangement of members 19 and 20 the chucking elements 21 would act as levers of the third class. With either the illustrated relation of the body and adjusting members or a reverse arrangement thereof the fixed pivot points of the chucking elements may be located on either the movable adjusting member or the stationary member as heretofore pointed out.

An important feature of the invention is that the work-engaging surfaces 43 of chucking elements 21 have only rotating motion about pivotal axes which always remain at fixed equal distances from axis 28 and which are equi-angularly disposed with respect to axis 28, which insures that if a workpiece should be removed from the fixture and then replaced the work-engaging surfaces 43 will always return to the same position in which they originally engaged the workpiece to thereby provide an extremely high degree of chucking accuracy.

It may be noted that inasmuch as the dimension between the pivotal axis 44 of each of chucking elements 21 and the axis of the respective actuating pin 46 is the same, when ring member 20 is rotated relative to body member 19 the lever arm acting to rotate the work-engaging surfaces 43 of each of the chucking elements 21 is identical and, inasmuch as each of the chucking elements 21 is of identical size and configuration, the work-engaging surfaces 43 of each of the elements 21 will always move through equal angles.

The fixture 14 further comprises means for insuring that the chucking elements are retained on their respective pins which comprises an annular ring-shaped retaining member 51 overlying chucking elements 21 which may be secured to the projecting portion 39 of base member 19 by means of a plurality of bolts 52 and spaced therefrom by spacers 53.

Figure 5:
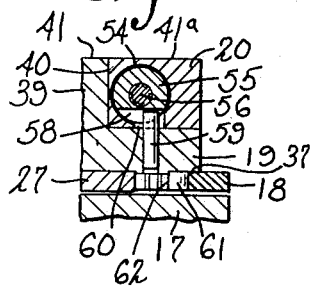
FIG. 5 is a view along section 5—5 of FIG. 4.
Figure 6:
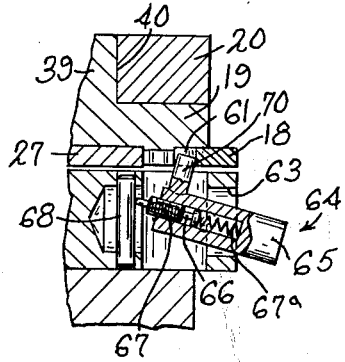
FIG. 6 is a view along section 6—6 of FIG. 2.
Figure 7:
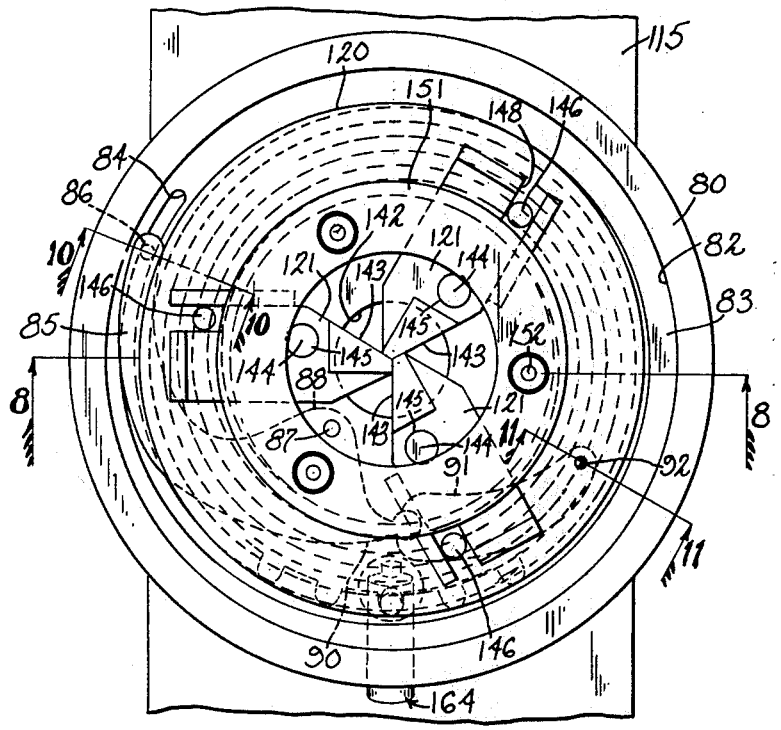
FIG. 7 is a view similar to FIG. 2 of a fixture in accordance with another embodiment of the invention.

To open the work-engaging surfaces 43 or to close the work-engaging surfaces 43 about a workpiece which is inserted in the workpiece-receiving recess 42 as exemplified by the broken line within recess 42 (FIG. 4) adjusting means are provided, as most clearly shown in FIGS. 4 and 5, which comprise a passageway or slot 54 defined in adjusting member 20 and extending to the exterior peripheral surface thereof.

Non-rotatably positioned in slot 54 is a nut 55 adapted to threadably engage therethrough an adjusting bolt 56 having a handle 56b thereon external of the adjusting member 20. Nut 55 has an indenture 58 defined therein arranged to engageably receive a pin 59 (FIG. 5) extending from body member 19. An arcuate slot 60 is further provided on the underside of adjusting member 20 through which extends pin 59. The length of arcuate slot 60 determines the limits on the degree of rotation adjusting member 20 and therefore the limits of movement of chucking elements 21. The adjusting means further comprises a sleeve 57 secured to adjusting member 20 by means of a pin 57a. A shoulder 56a on bolt 56 engages the in board end of sleeve 57, and a handle 56b secured to bolt 56 engages the outboard end of sleeve 57. To adjust the position of work-engaging surfaces 43 of chucking elements 21 relative to axis 28, handle 56b is rotated, which causes rotation of bolt 56 which in turn causes nut 55 to attempt to either advance or retract thereon. However, since nut 55 is fixed in relation to pin 59 which is secured in body member 19, nut 55 does not move. However, the reaction of pin 59 on nut 55 causes adjusting member 20 to rotate about axis 28.

Where the fixture embodying the invention is embodied in a machine tool where a workpiece must be presented to a cutting or grinding tool at selected positions or angles, fixture 14 further provides indexing means comprising indexing plate 18, which may have an index or calibration thereon as indicated in FIGS. 2 and 4, and means for locking the rotatable calibrating plate in a selected position. The indexing plate has detents 61 defined in its inner periphery 62 and equally spaced thereabout as most clearly shown in FIG. 2. An aperture 63 (FIG. 6) is tapped through the external peripheral surface of body member 20 extending toward axis 28 through a zero or reference scale position on indexing plate 18. Positioned in aperture 63 is a detent mechanism 64 which comprises a sleeve and handle portion 65 pivotally mounted intermediate its end on pivot points provided by screws 65a and 65b (FIG. 2) threadably received in base member 17. Sleeve portion 65 has a plunger 66 therein guidably positioned through sleeve 67 which is threaded within sleeve portion 65. The plunger 66 is biased by a spring 67a disposed within sleeve portion 65 towards a stop 68 which may comprise a pin positioned in an aperture 63 defined in body member 19 perpendicular to the axis of aperture 63. Extending transversely from sleeve portion 65 is a detent arm 70 adapted to fit within detents 61 defined in indexing plate 18. If detent arm 70 is raised into engagement with one of detents 61 the biased plunger will force the detent arm 70 into a detent 61 and thereby lock calibration plate 18 against movement. If it should be desired to change the index of the fixture 14 the detent arm 70 may be removed from a detent 61 by pressing handle portion 65 upwardly to move the plunger 66 against the bias of spring 67a and allow detent arm 70 to descend from engagement with a detent 61. When sleeve and handle member 65 passes through a horizontal position, spring 67a will hold it in a non-detent-engaging position and indexing member 18 with body member 19 thereon may be rotated about axis 28. When the indexing plate 18 has been moved to a newly selected position it may be locked at that position by the reverse procedure of that just described.

In the grinding machine of FIG. 1, bed plate 12 and/or table 15 may have their movement controlled by a pattern, or contour controlling means, not shown, which together with the indexing means disclosed may present the workpiece 22 to the plane of belt 13 in different positions so as to grind the workpiece 22 to a selected shape.

A work-holding fixture embodying the invention as thus far described is particularly useful in applications where the fixture is not required to rotate but merely to position, hold and index a workpiece designed to have a machining operation performed thereon. In some applications where the work-holding fixture is required to rotate, such as in a lathe or drill press, the projecting-adjusting handle 56b might be objectionable, therefore the invention provides alternate means of adjusting the position of the work-engaging surfaces 43.

Reference is now made to FIGS. 7 through 11 which illustrate a second embodiment of the invention. Throughout FIGS. 7 through 11 like or equivalent elements to elements of FIGS. 1 through 6 bear like-identifying numerals advanced by one hundred.

Figure 8:
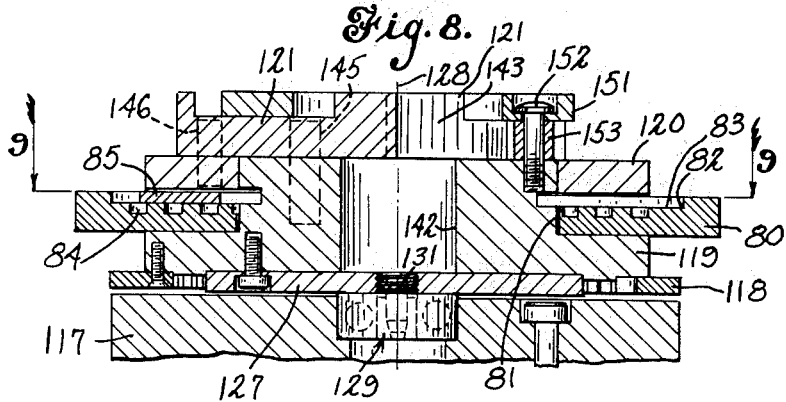
FIG. 8 is a view along section 8—8 of FIG. 7.

In the fixture of FIGS. 7 through 11 and as most clearly illustrated in FIG. 8, a chucking-element-adjusting means is provided which comprises an annular adjusting plate 80 coaxial with body member 119 with respect to axis 128 and concentrically disposed about a shoulder 81 defined on body member 119. An annular recess 82 is defined in the upper surface of adjusting plate 80 and further defined in surface 83 thereof is a spiral groove 84. A follower member 85 is received within recess 82. Follower member 85 has a guiding means comprising a pin 86 carried therein which extends into groove 84 and is arranged to be guided therein upon relative movement of adjusting member 80 and follower member 85. Follower member 85 is pivotally secured to body member 119 by means of a pin 87 extending through portion 88 of follower member 85 into a ledge 89 provided on body member 119. Pivotally connected to follower member 85 on arm 90 thereof is an adjusting-member-carrier 91 which is connected to adjusting member 120 by means of a pin 92 extending therebetween. The connection between follower member 85 and adjusting-member carrier 91 is made pivotable to prevent possible binding inasmuch as pin 86 and pin 92 will be at different radial distances from the axis 128 of the fixture because of the spiraling of groove 84.

With the adjusting arrangement illustrated in FIGS. 7 through 11, the position of the work-engaging surfaces 143 of chucking elements 121 may be adjusted by turning adjusting plate 80. When adjusting member 80 is rotated, pin 86 carried by follower member 85 will guidably follow the spiral groove 84 and move in a path indicated by the numeral 93 (FIG. 9). As pin 86 travels along path 93 it will cause follower member 85 to rotate about pin 87 which in turn causes rotation of arm 90 of follower member 85 with respect to pin 87 along a path identified by numeral 94. This motion of arm 90 exerts a force on carrier member 91 pivotally connected thereto to cause carrier member 91 to produce rotation of adjusting member 120 which is effective to cause the work-engaging surfaces 143 of chucking elements 121 to rotate about their respective pivot points 144 and thus adjust the chucking elements to either hold or release a workpiece inserted in recess 142.

It may be noted that the length of spiral groove 84 is very large with respect to the effective radial distance that pin 86 travels upon rotation of adjusting plate 80, therefore the adjusting means illustrated in FIGS. 7-11 may be considered analogous to a threaded adjusting bolt having a short lead with respect to its pitch.

If it were to be desired an indexing means, such as illustrated in the fixture of FIGS. 1 through 6, might be included in the fixture of FIGS. 7 through 11 as signified by the presence of indexing plate 118 in FIGS. 8, 10 and 11. However, in applications where a fixture embodying the invention is caused to rotate, as would be the case when the fixture is applied to the spindle of a lathe, the indexing mechanism may be omitted.

The invention, for purposes of disclosure has been illustrated and described in particular embodiments thereof. Modifications to the disclosed embodiments of the invention, as well as other embodiments thereof, may occur to those skilled in the art which do not depart from the spirit and scope of the invention. Therefore, it is intended that the appended claims cover all modifications and embodiments of the invention which do not depart from the spirit and scope of the invention.

What is claimed as new and is desired to be secured by Letters Patent of the United States is:

1. A workpiece-holding fixture for a machine tool adapted to perform an operation on a workpiece positioned and held in operative relation thereto along a reference axis established by said workpiece-holding fixture, said fixture comprising, first and second annular members disposed about a reference axis, a recess defined by one of said members adapted to receive a workpiece insertable therein, said one of said members having an annular projection of reduced dimension extending axially therefrom, the other of said members having an annular inner-peripheral surface receiving said projection concentrically therein, said other of said members being rotatable about said projection and said axis with respect to said one of said members; a plurality of chucking elements having work-engaging surfaces thereon adapted to engage and position a workpiece inserted in said recess, each of said chucking elements being pivoted about a respective point on one of said members; chucking-element-actuating means on the other of said members arranged to exert a force on said chucking elements upon rotation of said other of said members to thereby adjust the position of said work-engaging surfaces with respect to said axis; and adjusting means interconnecting said members for rotatively predetermining the position of said other of said members about said projection.

2. A grinding machine having an abrasive belt adapted upon movement thereof to perform a grinding operation on a workpiece, comprising a work-supporting member; a workpiece-holding fixture mounted on said work-supporting member adapted to operatively position a workpiece in relation to said grinding belt, said fixture comprising first and second annular members disposed about a reference axis, a recess defined by one of said members adapted to receive a workpiece insertable therein, said one of said members having an annular projection of reduced dimension extending axially therefrom, the other of said members having an annular inner-peripheral surface receiving said projection concentrically therein, said other of said members being rotatable about said projection and said axis with respect to said one of said members; a plurality of chucking elements having work-engaging surfaces thereon adapted to engage and position a workpiece to be ground in said recess, each of said chucking elements being pivoted about a respective point on one of said members; chucking-element-actuating means on the other of said members arranged to exert a force on said chucking elements upon rotation of said other of said members, to thereby adjust the position of said work-engaging surfaces with respect to said axis; and adjusting means interconnecting said members for rotatively predetermining the position of said other of said members about said projection.

3. A fixture for engaging and holding a workpiece, comprising first and second annular members disposed about a reference axis, one of said members having an annular projection of reduced dimension extending axially therefrom, the other of said members having an inner-peripheral surface receiving said projection concentrically therein, said other of said members being rotatable about said projection and said axis with respect to said one of said members; a plurality of chucking elements having work-engaging surfaces thereon adapted to engage and hold a workpiece, each of said chucking elements being pivoted about a point on one of said members; chucking-element-actuating means on the other of said members arranged to exert a force on said chucking elements upon rotation of said other of said members, to thereby adjust the position of said work-engaging surfaces with respect to said axis; and adjusting means interconnecting said members for rotatively predetermining the position of said other of said members about said projection.

4. A fixture for positioning and holding a workpiece comprising a first annular member having a reference axis; a second annular member coaxial with the first member; one of said members having an annular projection thereon of reduced diameter coaxial with the reference axis and the other of said members having an inner peripheral surface concentric with said projection and rotative thereon; a plurality of chucking elements having work-engaging surfaces thereon adapted to engage and position a workpiece, each of said chucking elements being pivoted about respective points on one of said members disposed radially equi-distant from the reference axis and spaced equi-angularly therefrom; chucking-element-actuating means on the other of said members arranged to exert a force on respective chucking elements upon rotation of said other of said members to rotate said chucking elements about their respective pivot points, said actuating means being radially equi-distant and equi-angularly disposed with respect to said reference axis; and adjusting means interconnecting said members for rotatively predetermining the position of said other of said members about said projection.

5. The fixture of claim 4 further comprising means for angularly indexing said fixture with respect to a reference plane.

6. The fixture of claim 4 wherein said adjusting means comprises an annular rotatable plate member having a spiral groove defined therein about said reference axis disposed about said first member, a follower member guidable in said groove and having a fixed pivotal connection to said first member, and a carrier member pivotally connected to said follower member adjacent one end thereof and pivotally connected to said other of said members at the other end thereof.

7. A workpiece-holding fixture comprising a first stationary member and a second member rotatable about said first member, means for adjusting the relative position of said second member with respect to said first member comprising a rotatable plate member having a spiral groove defined therein disposed about said first member, a follower member guidable in said groove and having a fixed pivotal connection to said first member, and a carrier member pivotally connected to said follower member adjacent one end thereof and pivotally connected to said second member at the other end thereof.

8. A fixture for engaging and holding a workpiece comprising, first and second annular members, one of said members having an annular projecting portion thereon arranged to concentrically mate with the other of said members whereby one of said members is rotatable about a common reference axis, a recess defined by at least one of said members about said axis adapted to receive a workpiece; a pin secured to one of said members and extending toward the other of said members; the other of said members having a slot defined therein adapted to receive said pin, means in said other of said members arranged to engage said pin, and means for controlling the position of said engaging means in said other member to thereby control the relative position of said members; a plurality of pins extending from one of said members, each of said pins being equally spaced radially from the reference axis; a plurality of similar chucking elements having work-engaging surfaces adjacent to one end thereof, each of said chucking elements being mounted on one of said pins and adapted to pivot thereabout to move its respective work-engaging surfaces with respect to the axis of said first and second members; means on the other of said members for engaging each of said chucking elements at points equally spaced radially from the reference axis and angularly spaced in the same relation as said pins, whereby upon relative rotation of said members, said work-engaging surfaces are caused to pivot about their associated pins and move equally relative to the reference axis.

9. The fixture of claim 7 wherein said first member has said projecting portion and said pins are mounted thereon.

10. A fixture for engaging and holding a workpiece comprising, first and second annular members, one of said members having an annular projecting portion thereon arranged to concentrically fit within the other of said members whereby said members are relatively rotatable about a common reference axis; a pin secured to one of said members and extending toward the other of said members; the other of said members having a slot defined therein adapted to receive said pin, a longitudinally extending passage defined in said other member containing means arranged to engage said pin, and means for controlling the relative position of said engaging means in said passage to thereby control the relative position of said members; a plurality of similar chucking elements having work-engaging surfaces adjacent one end thereof, each of said chucking elements being pivoted about a point on a first of said members, said points being radially equi-distant and equi-angularly spaced with respect to said axis; and means on the second of said members for engaging each of said chucking elements radially equi-distant and equi-angularly spaced from said axis, whereby upon relative rotation of said members said chucking element engaging surfaces are caused to rotate about their respective pivot points.

11. The fixture of claim 10 wherein said pivot points are provided by pins on said member having said projecting portion and said engaging means comprise pins on the other of said members disposed in slots in said chucking elements.

12. The fixture of claim 11 wherein said member having said pivot pins thereon is concentrically disposed within said other member.

References Cited in the file of this patent
UNITED STATES PATENTS

| 130,880 | Strong | Aug. 27, 1872 |
| 239,047 | Hyde | Mar. 22, 1881 |
| 749,794 | Inman | Jan. 19, 1904 |

(Other references on following page)

UNITED STATES PATENTS

| | | |
|---|---|---|
| 1,187,920 | Muller | June 20, 1916 |
| 1,252,928 | Muller | Jan. 8, 1918 |
| 1,399,786 | Messenger | Dec. 13, 1921 |
| 2,449,459 | Eckert | Sept. 14, 1948 |
| 2,593,706 | Von Zelewsky | Apr. 22, 1952 |
| 2,693,365 | Von Zelewsky | Nov. 2, 1954 |
| 2,765,176 | Hayward | Oct. 2, 1956 |
| 2,883,198 | Nurumi | Apr. 21, 1959 |
| 2,932,524 | Pealer | Apr. 12, 1960 |
| 2,934,864 | Karbowski | May 3, 1960 |
| 2,940,764 | Krontz | June 14, 1960 |
| 2,980,434 | Huffman | Apr. 18, 1961 |
| 2,985,458 | Everett | May 23, 1961 |

FOREIGN PATENTS

| | | |
|---|---|---|
| 598,950 | France | Oct. 10, 1925 |
| 583,893 | Great Britain | Jan. 2, 1947 |
| 776,327 | Great Britain | June 5, 1957 |